(12) United States Patent
Enzmann et al.

(10) Patent No.: US 6,671,359 B1
(45) Date of Patent: Dec. 30, 2003

(54) DYNAMIC CARRIER SELECTION

(75) Inventors: Mark Enzmann, Roswell, GA (US); Samuel N. Zellner, Dunwoody, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/452,882

(22) Filed: Dec. 2, 1999

(51) Int. Cl.⁷ .............................................. H04M 15/00
(52) U.S. Cl. .............................. 379/115.01; 379/221.01; 379/229
(58) Field of Search ..................... 379/201.01, 115.01, 379/115.02, 112.01, 118, 220.01, 221.01, 221.08, 221.09, 229

(56) References Cited

U.S. PATENT DOCUMENTS

| | | | | |
|---|---|---|---|---|
| 5,400,395 A | * | 3/1995 | Berenato | 379/130 |
| 5,473,630 A | * | 12/1995 | Penzias et al. | 379/130 |
| 5,570,417 A | * | 10/1996 | Byers | 379/220 |
| 5,590,182 A | * | 12/1996 | Stevens et al. | 379/130 |
| 5,712,907 A | | 1/1998 | Wegner et al. | |
| 5,781,620 A | * | 7/1998 | Montgomery et al. | 379/220 |
| 5,878,122 A | * | 3/1999 | White et al. | 379/130 |
| 5,881,139 A | * | 3/1999 | Romines | 379/130 |

\* cited by examiner

*Primary Examiner*—Creighton Smith
(74) *Attorney, Agent, or Firm*—Shaw Pittman LLP

(57) ABSTRACT

A system for determining the lowest cost long distance carrier is disclosed. The system uses long distance rate information to determine the lowest cost long distance carrier for a particular long distance telephone call. The system can also retrieve the dialing prefix for the long distance carrier. Once a dialed telephone number is received by the system, the system determines the lowest cost long distance carrier, adds the dialing prefix to the dialed number, and then outputs the entire string, that is, the prefix and the dialed number so that the long distance call is completed using the lowest cost long distance carrier.

11 Claims, 2 Drawing Sheets

DYNAMIC CARRIER SELECTION

BACKGROUND

1. Field of the Invention

The present invention is directed to a service provided by a local telephone company. Specifically, the service is designed to select the lowest cost long distance carrier for a particular telephone call.

2. Background of the Invention

Current methods for selecting a long distance telephone service carrier are cumbersome and inflexible. Generally, callers must select a certain long distance carrier to be assigned as their primary long distance carrier. Every long distance call originating from the caller's line is carried by the primary long distance carrier. Callers generally select a long distance carrier that they feel would provide the lowest overall cost. Callers generally are not willing to conduct the considerable amount of research and investigation to select a different long distance carrier for every long distance call.

Selecting the lowest rate for a particular call requires considerable research and investigation. Callers would have to review the rate schedules of various long distance carriers for the particular location to be called and the particular time of day for the call. The caller would then have to select the lowest cost carrier and then switch long distance companies. Since this procedure of selecting the lowest cost long distance carrier for every long distance call is not practical, callers generally choose a single long distance carrier that they estimate provides the lowest overall cost and stay with that carrier.

Recently, long distance carriers have begun to offer a selection service based on dialing prefixes. To use a long distance carrier that offers this service, the caller dials a prefix, such as 10-10-321 or 101-6789, or any other suitable prefix associated with that long distance carrier, before the long distance number. Although these services allow callers to switch long distance companies more easily than before, the callers still must determine the lowest cost long distance company overall and still cannot use the lowest cost long distance carrier for every call because this would require callers to investigate the rates of every carrier and select the lowest rate based on destination of the call and location. Time further complicates the selection of the lowest cost long distance carrier. Long distance providers generally vary the rates based on which day of the week the call is placed as well as at what time during the day the call is placed.

Factors that must also be considered are the terminating end points of the call. In other words, the location of the caller and the location of the called party must also be included when the lowest rate long distance carrier is determined. So, even with 101-XXXX service, it is still not practical for callers to use the lowest cost carrier for every call.

Attempts have been made to automatically select the lowest cost long distance carrier. For example, a prototype telephone has been demonstrated that includes an internal rate database. The internal database is updated periodically, presumably, weekly or monthly. When calls are placed, the telephone determines if the call is a long distance call. If the call is a long distance call, then the telephone consults the internal rate database, selects a carrier, and inserts a dialing prefix that routes the call to the selected long distance carrier.

There are several disadvantages. First, since the internal rate database is only updated at predetermined intervals, the database is not always current. Because telephone companies change their rates often, this lack of currency prevents this system from consistently selecting the lowest cost long distance carrier. Also, due to the relatively long period of time between updates, this system cannot exploit promotions, one-time offers, and other special discounts and deals that last only a short period of time.

Another problem with this system is the internal nature of the database. Because the database resides in a memory storage device in a telephone, only one phone in a given house or location is capable of using the benefits of the system. So, if the benefits of the system are desired throughout a house, apartment, or other location, every telephone must be replaced with a new telephone that includes this feature.

It is also unknown if the prototype telephone can determine the lowest cost long distance carrier for a given time of day and for a given lowest cost carrier function of originating and terminating points and time of day.

SUMMARY OF THE INVENTION

The present invention is designed to overcome the shortcomings of the prior art and to provide a local telephone service that selects the least costly long distance service for a particular telephone call. The call can include voice, data, video, fax, a combination of these forms of communication, or any other signal. The invention is designed to simplify long distance carrier selection for the consumer and seamlessly integrate with current calling procedures, i.e., the caller would just dial the 1+area code+phone number.

The present invention is preferably a service offered by a telephone company and operates by having the telephone company select the least costly long distance carrier for a particular call based on time of day and calling location. When a subscriber to the service originates a long distance call, the telephone company recognizes the call as a long distance call, and then routes the dialed number to a database that includes rate information. The system then uses algorithms and information contained in the database to determine the lowest cost available long distance carrier for that specific call. After the lowest cost carrier has been determined, the system returns a calling prefix that associates the call with the lowest cost carrier. The system then adds the calling prefix corresponding to that lowest cost carrier to the telephone number, and the call is placed. This ensures that the lowest cost available carrier will be used for the long distance call.

Another feature of the present invention is the method by which the database collects and retains rate information. The present invention includes provisions to allow the database to constantly update its rate database by communicating with the different long distance companies' rate databases. The present invention also includes provisions for updating the rate database at predetermined intervals.

An object of the present invention is to reduce the cost of long distance service.

Another object of the present invention is to help callers select the lowest cost long distance carrier for a particular call.

Another object of the present invention is to provide a system that maintains current rate information for various long distance carriers.

Additional features and advantages of the invention will be set forth in the description which follows, and in part will be apparent from the description, or may be learned by practicing the invention. The objectives and other advantages of the invention will be realized and attained by the structure particularly pointed out in the written description and claims as well as the appended drawings.

DETAILED DESCRIPTION OF THE INVENTION

Figure 1:
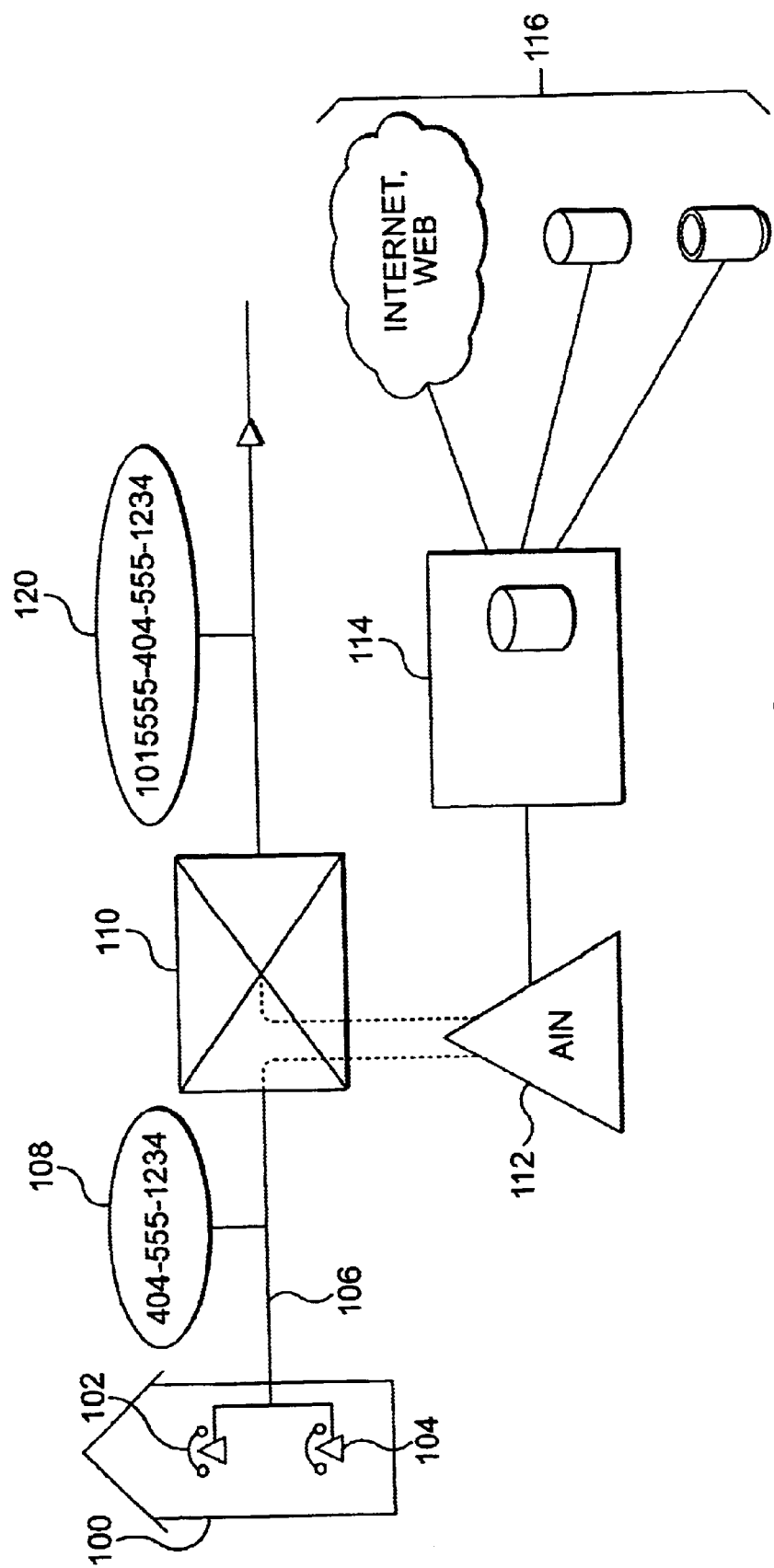
FIG. 1 is a schematic diagram of a preferred embodiment of the present invention.
Figure 2:
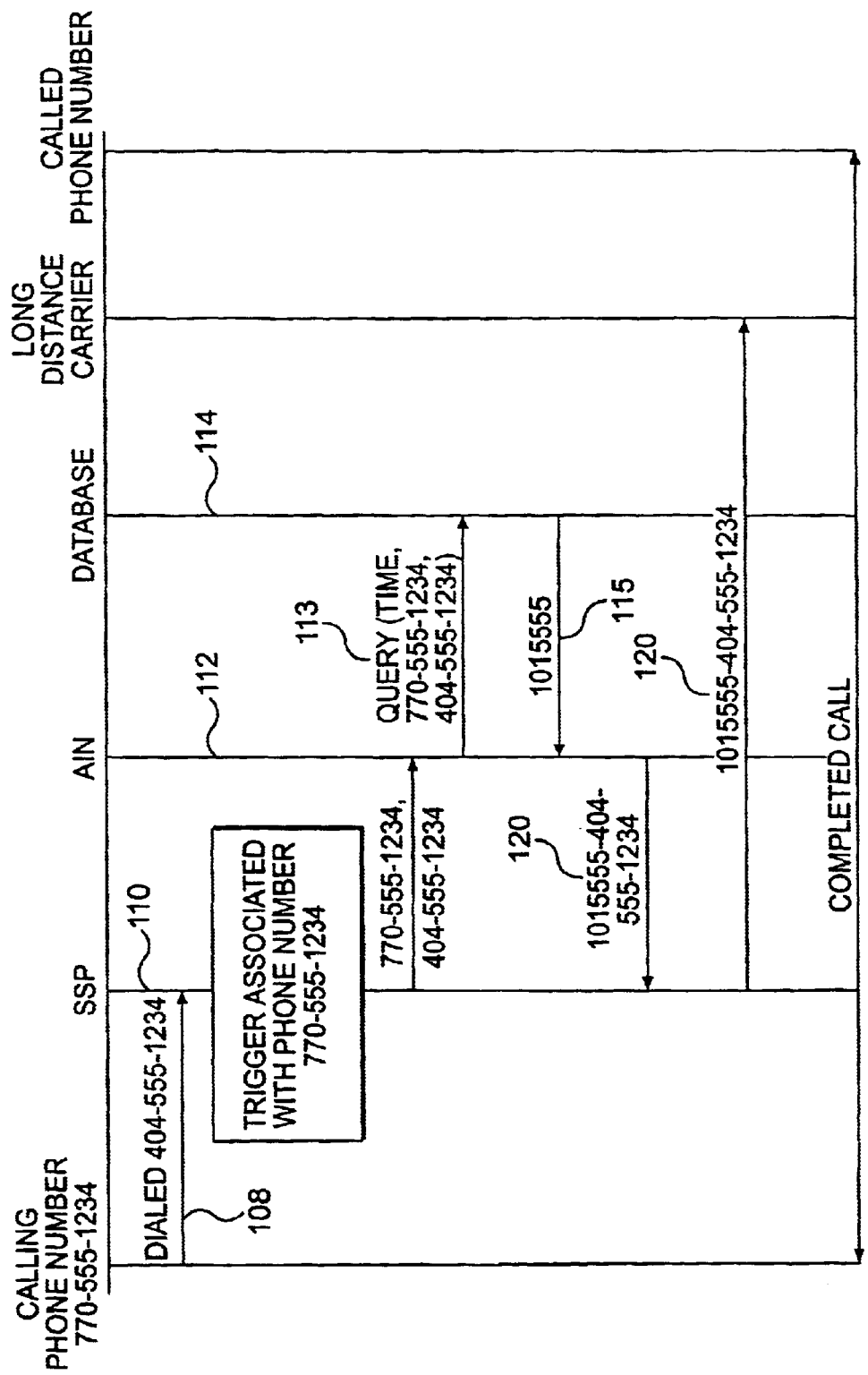
FIG. 2 is a call flow diagram of a preferred embodiment of the present invention.

Referring to FIGS. 1 and 2, a structure 100, which could be a dwelling, a commercial building, or any other location which uses long-distance telephone services, includes a telephone 102. Additional telephones 104 can also be present in structure 100. Telephones 102 and 104 share a common line 106. Additional phones and additional phone lines are generally also present, but for clarity and simplicity, only one line is shown in FIG. 1. However, the principles of the invention can clearly be applied to additional phones and additional telephone lines within the same structure.

To use the dynamic carrier selection service, the user must contact the telephone company and subscribe to the service. The telephone company preferably keeps a record of the subscribers and notes their originating telephone numbers. In the example shown in FIG. 1, it is assumed that a subscriber has requested dynamic carrier selection service for phone line 106 of structure 100. In the example show in FIGS. 1 and 2, the calling party's phone number is 770-555-1234.

When a call is placed from structure 100, the following process occurs. The call is placed with a dialed long distance number 108. In this case, the dialed telephone number 404-555-1234 is used as an example, although the invention can be used with any dialed telephone number.

The dialed number 108 travels down phone line 106. The dialed phone number 108 reaches a local telephone company switch 110, for example, an SSP. The switch has been pre-programmed to know which telephone numbers subscribe to the dynamic carrier selection service. In the example shown in FIG. 2, a trigger has been associated with the calling party's telephone number. For those numbers that do not subscribe to the service, the call progresses normally. But for those lines that have selected the dynamic carrier selection service, the AIN (advanced intelligent network) 112 takes control of the call. In one embodiment of the invention, a service package application that resides on the AIN 112 would coordinate the dynamic carrier selection service. Other arrangements on the AIN 112 could also be used to coordinate the dynamic carrier selection service. In the example shown in FIG. 1, telephone line 106 has subscribed to the dynamic carrier selection service so the AIN 112 would take control of the call.

The AIN 112 determines that the call is a long distance call, so the AIN 112 queries 113 a database 114. The query includes the time the call is being placed, along with the calling party's phone number and the called party's phone number. Database 114 includes an algorithm to determine the lowest cost carrier and includes a long distance rate database. The database 114 preferably uses both the lowest cost algorithm and the long distance rate database to determine the long distance carrier with the lowest cost for the current call; that is, given the time of the call and the terminating end points of the call, the database 114 determines which long distance carrier would provide the lowest rate. In the example shown in the Figures, the lowest carrier has an associated dialing prefix of 1015555.

After the lowest cost carrier has been determined, the database 114 provides a dialing prefix or some other way to associate the current call with the selected lowest-cost available carrier. This step is shown as 115 in FIG. 2. Any dialing prefix that is associated to a carrier may be used in the example shown in FIG. 2. As noted above, in the example shown in the Figures, a dialing prefix 1015555 is associated with the lowest cost long distance carrier. After this dialing prefix is returned 115 to the AIN 112, the AIN 112 adds the dialing prefix to the called number, and this entire dialing string 120 is returned 117 to the SSP. Note that the dialing string 120 would be 1015555-404-555-1234 in the example shown in FIGS. 1 and 2. After the SSP 110 receives dialing string 120, SSP 110 then dials the prefix and the telephone number of the called party, thus placing and completing the call using the lowest-cost long distance carrier.

Database 114 can collect rate information in a variety of ways. For example, Database 114 could search the Internet or other sources of information, such as proprietary databases and other databases (all of these sources of information are represented as item 116 in FIG. 1), each time the AIN 112 queries a lowest cost long distance carrier. In other words, the Database 114 can collect and assemble rate information from various sources of information 116 each time the AIN 112 requests a lowest cost long distance carrier.

However, because web access and database access is generally relatively slow compared with the time it takes to complete a long distance call, the invention preferably uses a systematic approach to assembling and maintaining a long distance rate database. Preferably, a reasonably current rate database is constantly maintained by Database 114. Database 114 is preferably programmed to gather rate information, either by query or by download from a variety of information sources 116. These sources of information 116 can include the Internet, proprietary databases and other databases that contain rate information, for example, databases maintained by long distance companies. The database 114 is preferably programmed to gather the rate information at preselected intervals. For example, the rate information can be gathered every day, every hour, every 30 minutes, every 10 minutes or whatever interval is required to produce a current, up-to-date long distance rate database. In this way, current long distance rate information is maintained all the time at database 114, and database 114 does not have to gather information for each long distance call. This generally speeds the retrieval of information and enhances performance.

Operating in this way, the present invention is able to assist users in lowering their monthly telephone bills because the present invention selects the lowest cost long distance carrier for every individual call, as opposed to other systems that select a lowest overall cost carrier. Additionally, the invention allows every existing phone, 102 and 104 (see FIG. 1) for example, in a given structure to use the lowest cost carrier for every single long distance call without requiring the purchase of additional equipment; unlike related devices that require the purchase of additional equipment for every telephone the lowest cost carrier selection feature is desired.

Any of the various components or sub-steps disclosed above can be used either alone, or with other components, or with components or features of the present invention.

It will be apparent to those skilled in the art that various modifications and variations can be made to the dynamic carrier selection system of the present invention without departing from the spirit or scope of the invention.

The foregoing disclosure of embodiments of the present invention has been presented for purposes of illustration and description. It is not exhaustive or intended to limit the invention to the precise forms disclosed herein. Many variations and modifications of the embodiments described herein will be obvious to one of ordinary skill in the art in light of the above disclosure. The scope of the invention is to be defined only by the claims appended hereto, and by their equivalents.

What is claimed is:

1. A system for selecting a long distance carrier for a dialed long distance telephone call comprising:
   (a) the system adapted to receive a dialed telephone number in response to a query via an AIN trigger upon detecting that the telephone number is for a long distance call;
   (b) the system comprising rate information of at least two long distance carriers, wherein rate information is dependent in part upon the time that the dialed telephone number is received;
   (c) the system capable of determining a lower cost long distance carrier based in part upon the time at which the dialed telephone number is received and capable of determining a dialing prefix associated with the lower cost long distance carrier; and
   (d) the system adding the dialing prefix to the dialed number so that the call is carried by the lower cost long distance carrier.

2. The system according to claim 1, wherein the dialing prefix and the dialed number are returned to the local telephone company.

3. The system according to claim 1, wherein the system maintains rate information.

4. The system according to claim 1, wherein the system retrieves rate information at preselected intervals.

5. A method for selecting a low-cost long distance carrier comprising the steps of:
   (a) receiving a dialed telephone number in response to a query via an AIN trigger upon detecting that the telephone number is for a long distance call;
   (b) comparing rate information associated with the dialed number of at least two long distance carriers, wherein rate information is dependent in part upon the time that the dialed telephone number is received;
   (c) determining a lower cost long distance carrier based in part upon the time at which the dialed telephone number is received;
   (d) determining a dialing prefix associated with the lower cost long distance carrier; and
   (e) adding the dialing prefix to the dialed number so that the call is carried by the lower cost long distance carrier.

6. The method according to claim 5, wherein the dialing prefix and the dialed number are returned to a local telephone company to place a call.

7. The method according to claim 5, wherein rate information is maintained in a database.

8. The method according to claim 5, further comprising the step of retrieving rate information at preselected intervals.

9. A system for selecting long distance carriers based on the cost of specific dialed telephone calls comprising:
   (a) a trigger associated with a subscriber's line at a switch in a service switching point on an intelligent telephone network;
   (b) a service package application on the intelligent telephone network; and
   (c) a database comprising long distance carrier rates, wherein
      when the system receives a long distance telephone call to a long distance telephone number from the subscriber's line, the trigger prompts a query to the service package application,
      the service package application provides the long distance telephone number to the database,
      the database determines the lowest cost long distance carrier,
      the database adds a prefix to the long distance number of the long distance telephone call, the prefix associating the telephone call with the lowest cost long distance carrier, and
      the service package application returns the prefix and the long distance telephone number of the long distance telephone call to the service switching point.

10. The system according to claim 9, wherein the database maintains rate information.

11. The system according to claim 9, wherein the database retrieves rate information at preselected intervals.

* * * * *